(12) United States Patent
Twardowski et al.

(10) Patent No.: US 6,213,931 B1
(45) Date of Patent: Apr. 10, 2001

(54) STUMP GRINDING TOOTH

(75) Inventors: Eric Twardowski, Spring; Gordon Collier, Houston, both of TX (US)

(73) Assignee: Dennis Tool Company, Houston, TX (US)

( * ) Notice: Subject to any disclaimer, the term of this patent is extended or adjusted under 35 U.S.C. 154(b) by 0 days.

(21) Appl. No.: 09/458,129

(22) Filed: Dec. 9, 1999

(51) Int. Cl.⁷ ............................................. B23F 21/03
(52) U.S. Cl. ........................................... 541/540; 125/3
(58) Field of Search ........................... 451/540, 548; 51/307, 309; 125/3, 28; 144/235, 241, 236, 218; 83/648

(56) References Cited

U.S. PATENT DOCUMENTS

| | | | | |
|---|---|---|---|---|
| 4,726,718 | * | 2/1988 | Meskin et al. ........................ | 125/39 |
| 4,757,848 | * | 7/1988 | Mollberg, Jr. ........................ | 144/241 |
| 4,759,394 | * | 7/1988 | Clemenson .......................... | 144/235 |
| 4,972,637 | * | 11/1990 | Dyer .................................... | 451/540 |
| 4,998,574 | * | 3/1991 | Beach et al. ......................... | 144/241 |
| 5,005,622 | * | 4/1991 | Beach et al. ......................... | 144/241 |
| 5,472,376 | * | 12/1995 | Olmstead et al. ................... | 451/540 |
| 5,486,137 | * | 1/1996 | Flood et al. ......................... | 451/540 |
| 5,971,087 | * | 10/1999 | Chaves ................................ | 451/540 |
| 6,042,463 | * | 3/2000 | Johnson et al. ..................... | 451/540 |

* cited by examiner

*Primary Examiner*—Derris H. Banks
(74) *Attorney, Agent, or Firm*—Marc A. Hubbard; Munsch Hardt Kopf & Harr, P.C.

(57) ABSTRACT

The present disclosure is summarized as an improved cutting tooth for mounting on a stump cutting wheel driven by a suitable power plant. The tooth itself includes a long root to enable it to be clamped on the cutting wheel. When appropriately clamped, it is held with an extending neck terminating in a planar face. The face is constructed with an improved PDC hard surface layer. This is attached by a suitable WC-Co sintered alloy which joins the PDC layer to the tooth. This enables more certain anchoring of the PDC layer to the tooth. This enables more certain anchoring of the PDC face so that it does not break or flake during use and operation.

20 Claims, 1 Drawing Sheet

STUMP GRINDING TOOTH

BACKGROUND OF THE DISCLOSURE

This disclosure is directed to a stump grinding mechanism.

More specifically, it is a removable insert which is mounted and dismounted from a stump grinding wheel for the express purpose of dressing or trimming the stump grinding wheel periodically by changing or otherwise replacing the teeth as they wear. The replaceable teeth in the stump grinder of this disclosure are especially long use teeth. This is one of the benefits of the disclosed construction, namely that use on a repeated and extended basis permits a very long life. Even when a tooth is worn, the tooth can be removed and replaced easily. In the event that the tooth is broken, it can be dressed by repair and then reinstalled. Perhaps this will become more apparent on description of the stump grinder in operation. To consider the device somewhat more carefully, a stump grinder is often required to lower the protruding stump to a level which is below grade so that it does not interfere with lawn maintenance equipment. In an agricultural setting, the stump may have to be removed even below the surface so that it no longer interferes with spring time plowing or other pasture or farm maintenance. For instance, a small stump may not pose much of a problem to a gang plow pulled behind a tractor, but a stump of perhaps 12 inches diameter, even when cut to grade level, might snag one plow of the gang and either break it, or deflect the multiple plow points pulled in the gang and divert or misdirect the plowed furrows. In that instance, it is necessary to grind away the stump to the point that it is significantly below grade. This is necessary to assure that the plows do not snag on that stump at any of the plow points.

Stump removal has a good deal of value to those who keep a nice lawn. But, the value is equally as important to farmers and ranchers. Commonly, stump grinding tools use a type of cutting device. The cutting device is brought against the stump to grind it away. Surprisingly, stump removal can be relatively difficult in that the context is often somewhat risky. By that, references made to the fact that the area or region where the stumps are located may very well be in new construction where the construction itself is a construction site strewn with buried trash. In that instance, the buried trash can pose a serious risk to the stump grinder because it may well include trash which is unusually difficult or hard to deal with. Consider, for instance, a stump which is located below grade and is in a region where construction trash was dumped. That may well include buried pieces of concrete including reinforcing bars, etc. This poses some degree of risk. The risk is often endangered by breaking a tooth or more than one tooth. In this particular instance, the present apparatus enables quick and easy servicing, thereby permits replacement of an individual tooth or replacement of several teeth, depending on how many might be damaged.

The tooth construction of this disclosure utilizes a tool body which will be defined as the tooth root. That term will be defined below. Essentially, while it does not cut, it has the form of a long root which can be clamped and connected with the cutter wheel. That term will be defined also. Going more importantly to the contact region, this disclosure sets forth a polycrystalline diamond compact (PDC herein below) which is affixed to the tooth. In the preferred forms, there being two or three different forms given, the tooth is constructed with a root of tool steel of sufficient resiliency that it is not brittle and has a measure of give. A neck on the tool is located toward one end of the root. The neck terminates at a planar region having a specified angle with respect to the direction of rotation. Accordingly, the neck terminates in a face and the face region is used to support the attached PDC member. In the preferred embodiment, the PDC member is preferably a circular disc having a diameter of up to about 1.125" at one extreme to about 0.50" for the preferred size, and up to about 2.375" inches at the larger extreme. The PDC thickness is somewhere between about 10 to about 120 mils. The PDC layer is commonly made in sizes which falls well within the range just mentioned. It is attached by an underlayer supporting it and serving as an adhesive for attachment to the tooth. Being attached at the end of the root, it is positioned so that it contacts against the stump.

While one would readily suppose that cutting stumps, i.e., cutting wood is somewhat easier, there is the risk of underestimating the difficulty of the chore. More specifically, the cutting face does not just contact wood. It is brought into contact with dirt, fill sand, and any other piece of buried debris which might be in the area. This creates a measure of risk to the equipment. This also creates a severe wear factor at the time of contact against the unwanted debris which is in the way. The cutting action accomplished by this is done on a rotating wheel. The wheel rotates at a steady or stable speed determined by the tractor or other equipment which operates it. One such tractor is the model 252 stump cutter which is provided by Vermeer, a known source of stump cutters. The model just mentioned is a device which weighs about 1,040 pounds and which is powered by a 25 horsepower motor. Other versions use a 20 horsepower motor. The motor will typically operate a hydraulic system which in turn, rotates the cutting wheel. In the one just mentioned, the cutting wheel diameter is about 16 inches without teeth, and about 19 inches with the teeth. It typically has a thickness of about five inches and is rotated at a speed of about 1,250 rpm and supports cutting teeth which are received in suitable pockets. Commonly, 16 teeth will suffice for the cutting wheel. When operated at the above described speed, it has the powerful effect of grinding a stump and turning it into small wood chips and shavings which are scattered around. It is preferably swept to the left and right to grind away the stump and to reach underground. As will be understood, that is often when unintended accidents occur and teeth are badly damaged or broken away. The present disclosure sets forth a replacement tooth for this sort of device.

Moreover, it is replacement tooth which provides enhanced life and which is able to assure that the teeth can be easily replaced and the cutting action continued.

SUMMARY OF THE PRESENT DISCLOSURE

The present disclosure is summarized as an improved cutting tooth for mounting on a stump cutting wheel driven by a suitable power plant. The tooth itself includes a long root to enable it to be clamped on the cutting wheel. When appropriately clamped, it is held with an extending neck terminating in a planar face. The face is constructed with an improved PDC hard surface layer. This is attached by a suitable WC-Co sintered alloy which joins the PDC layer to the tooth. This enables more certain anchoring of the PDC face so that it does not break or flake during use and operation.

BRIEF DESCRIPTION OF THE DRAWINGS

So that the manner in which the above recited features, advantages and objects of the present invention are attained can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

Figure 1:
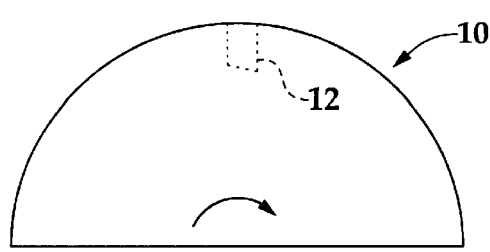
FIG. 1 is a view showing one half of a cutter wheel having a pocket formed therein to receive and support a tooth.

Attention is first directed momentarily to FIG. 1 of the drawings. This shows a cutter wheel 10 for a stump grinder. One is exemplified by the above mentioned representative stump cutter device, which is the model 252 manufactured by Vermeer. There are other sizes and other models, and in addition, there are other vendors of stump cutters. The Vermeer model 252 is incorporated by reference as a representative stump cutting mechanism, and the stump cutter will be described using that particular model as a representative device. Accordingly, the wheel 10 shown in FIG. 1 rotates in a direction indicated by the arrow and has a diameter of about 16 inches. It is constructed with a pocket 12. The pocket 12 is sized to receive an individual tooth. The individual tooth is mounted with the root of the tooth positioned in the pocket 12. It is clamped down by locking in place with a tooth pocket. Details of the cutter wheel and tooth pocket are believed to be well known in the art and represent a relatively mature industry and product line. The pocket 12 is shown to aid and assist the explanation which follows below. That explanation is enhanced by certain angular relationships which are tied to the construction of the cutter wheel 10. And, that understanding will be enhanced by describing how the cutter wheel supports teeth which define four different cutting paths.

Figure 2:
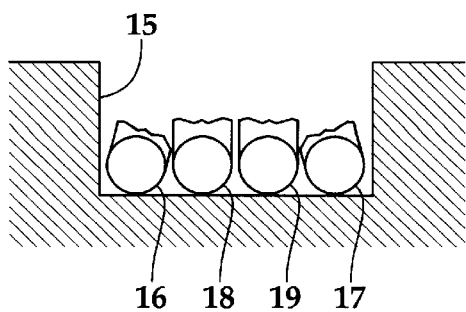
FIG. 2 is a kerf cut by the cutting wheel of the present disclosure supporting multiple teeth which strike at different locations in the kerf as illustrated.

Momentarily going to FIG. 2 of the drawings, it shows a kerf which is cut by the cutting wheel 10. While the cutting wheel has been omitted, the cutting wheel has a distinct width. The width of the cutting wheel is such that it carries cutters along four particular pathways. The individual cutters will be discussed in detail below. However, to provide geometric positioning of the individual cutters, FIG. 2 shows a kerf 15 which is cut in a wood stump by the passage or trajectory of four different teeth supported on the cutting wheel 10. One tooth cuts in the region 16, and a comparable tooth cuts in the tooth 17 along the opposite side edge. These involve teeth which are set at an angle. The regions 16 and 17 are thus cut by teeth which are identical in construction, but which have a bend or angle on the opposite side so that duplicate cutters are effectively used. Between the extremes of the far left and right, the cutting pathway also is defined by the cutting face 18 and the companion cutting face 19. They are mounted on straight teeth, as will be discussed. As will be understood, the kerf 15 is somewhat idealized in this view. Moreover, smooth wood finishing is not the goal and cutting a smooth edged kerf in the fashion of cutting with a rip saw is not the goal either. The position of the four cutters, and in particular, the four cutting faces as illustrated at 15–19 is important to understand how the device operates. To this end, the cutting wheel is not a thin blade. Commonly, the cutting wheel mounts one or more cutters which move in one or more circular trajectories.

The circular trajectory achieved by the cutting wheel in this illustrated version involves the use of four separate cutters. These cutters are mounted on the periphery of the cutting wheel 10. As a practical matter, the wheel 10 is relatively thick and there are multiple cutters on it. As for example, in the Vermeer model 252, there are 12 cutters so that each of the cutting paths shown in FIG. 2 is formed by three different cutters. They are evenly spaced with respect to each other around the circle of the wheel, i.e., three cutters in each row accomplish the cut done at 15 and they are spaced at 120 degree spacing. In like fashion, three inserts are used for each of the trajectories which cut the full kerf 15 shown in FIG. 2. As noted, the cutting wheel is swept to the side so that no kerf is actually made in the traditional sense of a cutting blade; rather, the teaching of FIG. 2 merely shows how different teeth are installed around the periphery of the cutting wheel and the different teeth accomplish the cuts shown. This, of course, is used to completely grind away the entire stump and surrounding area.

Figure 3:
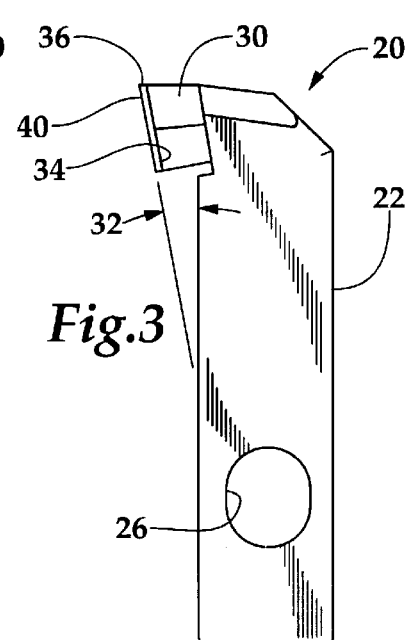
FIG. 3 is a side view of a tooth in accordance with the present disclosure adapted for installation in the cutting wheel of FIG. 1.

Going now to the other drawings, it will be observed that an individual cutter is shown in side view at FIG. 3. The cutter 20 comprises a long tooth 22 which has an extended root 24. There is a recess or dimple 26. It is in the side and is located so that it is aligned against or in conjunction with a particular pocket and clamp mechanism.

The tooth or insert will be identified generally by the numeral 20. In very general terms, it is constructed, as noted, of a shock resistant steel. Preferably, it is a solid, well constructed member, typically being a forged part. It has the necessary resiliency so that it does not break or shatter during operation. It is subject to shock loading and bending, recognizing that the root 24 is commonly anchored while the outer end is exposed to cutting, hence chattering contact with wood which is hopefully soft, but also with other materials which may provide sudden shock loading. In any instance, it is subject to that kind of shock and is preferably made of shock resistant steel.

The individual tooth 20 is constructed with the cantilevered portion which extends above the dimple 20 and out beyond the edge of the cutting wheel 10. Recognizing that it is commonly mounted along a radial line, hence the construction shown in FIG. 3 is coincident with a radial of the wheel, there is an angled face region 30 which terminates in a circular disc. The face region 30 is on a deflected or bent neck. It faces the direction of rotation so that the face is brought into contact. It will be observed that the face is mounted with a forward angle 32. This angle is preferably included so that the face portion terminates in a planar surface 34 which confronts the body of the stop and any other surrounding debris for cutting purposes. Rather than planar contact, the face 34 is tipped so that the outer most edge 36 has a slight leading angle which is less than the angle 32 just mentioned. Preferably, this leading angle is slight, and is typically in the range of about zero to five degrees, and is preferably in the range of about one to four degrees. The optimum seems to be around two degrees. While the angle can be much larger, there would be a tendency of the cutting face to form wood chips which would curl, and that may have a tendency to bind cutting. As the lead angle approaches zero, the chips formed are more aptly to break away and by splintering, become more separate, thereby avoiding the formation of long curled chips. Adjustment of this angle impacts the size and nature of the chips. Also, and in a random sense, the chip formation is impacted by the angle of advance of the cutter against the stump and the relative angle of the cutter motion with respect to the grain of the stump. There is no need for the operator to make any special effort to match the cutter up with the direction of the grain. In that sense, the random orientation of the stump grain with respect to the cutter motion is a matter of indifference.

The apparatus of the present disclosure utilizes a protective and hardened face. It is commonly formed as a circular disc or chip of the above mentioned PDC material. That is attached to the body by means of a braze layer. The braze layer is a few mils thick and is preferably formed of an alloy of metals common for such attachment. The cemented WC layer typically is formed of cobalt ranging anywhere from about 6% at the least up to about 30% at the maximum end. The remainder of the metal in the braze layer is a mix of alloyed metals, the braze material being well understood. The braze metal is used to attach the PDC cutter. The PDC cutter is preferably circular and has a diameter that matches the diameter of the face 34. The circular disc is a flat or planar disc having parallel top and bottom faces. Non-planar surfaced geometries will suffice as well. The circular disc preferably has a thickness of a few mils up to about 25 mils normally, and can be as thick as 120 mils. The PDC disc is preferably formed of a cobalt alloy bonded matrix of tungsten carbide particles mixed with diamond particles. The tungsten carbide (WC herein below) are commingled with the diamond particles and they are joined together by the adhesive nature of a cobalt alloy. Again, the cobalt alloy that binds the PDC layer into a unitary body typically has between about 75% and about 95% cobalt. The optimum is typically about 88% to 94% cobalt.

The cobalt bonded alloy holds the WC and diamond particles together in a shock resistant body. Preferably, the bulk of the body is made of WC particles. Preferably, the WC content of the PDC layer is typically about 67% or greater and can be as high as about 75% of the layer. The cobalt alloy which holds the particles together is typically in the range of about 4% to 10%. The preferred is around 6% to 8%. While it is possible to include up to about 80% of diamond content, it is not necessary that the cutter be that hard. Rather, the inclusion of a reduced amount of diamond particles and increase in the tungsten carbide particles provides a somewhat more rugged cutting surface. While a reduction in the diamond content reduces the hardness, the shock resistant ability of a finished PDC layer is enhanced. PDC cutters used in rockdrilling tools have shown very good performance in this application. Also, test of partially worn used cutters recovered from used bits have worked very well. The used cutters may have superior impact resistance overall as the weaker cutters are broken during the drilling operates.

It is possible by well known high pressure, high temperature processing devices to manufacture the PDC chip so that it has the form of a unitary disc of the requisite thickness and diameter. The mixture that is accomplished in this can be varied within the confines noted above. It is also possible to form this disc by microwave sintering. When that process is applied, the mix of particles are placed in a suitable mold, specified size and shape.

The microwave energy directed into the particles prompts radical heating and internal bonding within the matrix of particles is then accomplished so that a unitary device is formed. The finished product is installed as noted by brazing it to the tool as a blank. The tool blank is commonly made of tool steel which can have a hardness up to that common for 4180 steel. Usually, steel of that quality is not needed and lesser steels of the 4100 series will suffice. This yields a tooth assembly of sufficient hardness and of sufficient resiliency that it will stand up to the wear and tear of its operation. Moreover, this provides one which can be easily mounted and dismounted by simple engagement in the pocket 12 where the dimple 26 is used to anchor and position the tooth.

Figure 5:
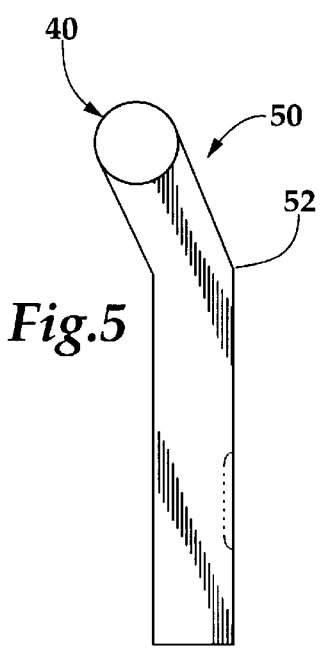
FIG. 5 is a view of a bent tooth showing a similar construction to that of FIG. 4 wherein the bent tooth defines a wider kerf.
Figure 4:
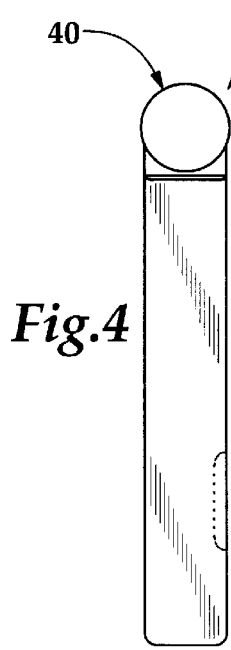
FIG. 4 is a view of the same tooth shown in FIG. 3 which view is at right angles to FIG. 3.

Going back to FIG. 4 of the drawings, the finished device is shown with the PDC layer 40 attached. The layer 40 is joined, as mentioned, by brazing. It is anchored on the tooth 20 in the fashion stated. FIGS. 3 and 4 show a tooth assembly which does not have a bend or deflection in it. By contrast, the embodiment 50 shown in FIG. 5 is a tooth which has a bend at 52. In other aspects, the tooth is essentially the same as the tooth shown in FIGS. 3 and 4. As stated, it still includes the insert 40 at the outer end of the tooth. It has a common angle and common construction and mounting as that previously discussed. Primarily, the difference between the teeth 20 and 50 is the bend or angle 52. This enables teeth to be mounted on the wheel 10 to extend into the different relative positions 16, 17, 18, and 19 depicted in FIG. 2 of the drawings.

Figure 7:
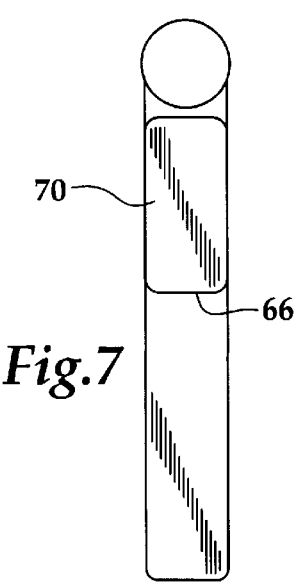
FIG. 7 is an orthogonal view to the separate tooth shown in FIG. 6.
Figure 6:
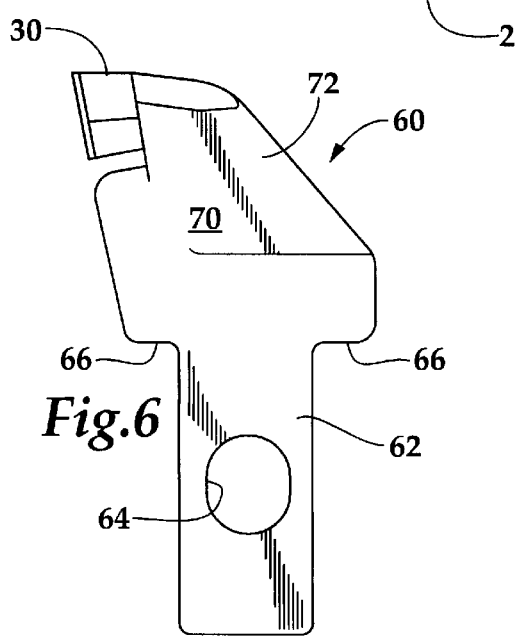
FIG. 6 is an alternate form to the tooth shown in FIG. 3.

An alternative form of tooth is now shown in FIGS. 6 and 7 when considered jointly. This tooth 60 is constructed with a long root 62 having a dimple 64 for locking purposes. The tooth has a common cross sectional area in that region, very much comparable to the cross section area of the tooth 20 shown in FIG. 3. However, it has an enlarged and overhanging shoulder 66 which is adapted to be contacted with the outer periphery of the wheel 10. This defines a tooth body 70 which is wider and therefore, somewhat more rugged. It has more weight in it. Because it is wider and has a thicker body, it is less inclined to chatter or vibrate during operation. To that end, even the outer most neck portion at 72 is thicker and made more substantial. As before, the face portion 30 has the same dimensions and same relative angular positions as the version shown at FIG. 3. In other aspects, the tooth 60 shown in FIGS. 6 and 7 is constructed in essentially the same fashion. Moreover, the tooth 60, having a thicker body in the shock dimension, i.e., the dimension which is exposed to impact during operation, is able to provide a more stable cut. While this is not particularly important in terms of making a smooth kerf, it is important to stabilize the motion and position of the equipment during operation. Accordingly, the embodiment 60 has that slight advantage of greater body and reduced shock loading compared to the version 20 previously mentioned.

While the foregoing has been directed to the preferred embodiment, the scope is determined by the claims which follow.

What is claimed is:

1. A stump cutting tooth for use in a rotating wheel for cutting a stump to below ground level wherein the rotating wheel has a rotating periphery with pockets therein to receive removable teeth therein and the teeth comprise:

(a) an elongate root having a sufficient length to extend into a tooth pocket to enable the tooth to be clamped and held by the rotating wheel;

(b) an extending face portion mounted at an angle so that the face portion provides cutting motion when mounted on the wheel and rotated against the stump; and (c) a PDC layer attached to the face portion so that the PDC layer contacts the stump with a cutting motion.

2. The apparatus of claim 1 wherein said PDC layer is formed of diamond particles in an alloy binding the diamond particles to form a unitary body.

3. The apparatus of claim 2 wherein said PDC layer forms a unitary body having a thickness of between about 10 and about 120 mils and said PDC layer comprises at least about 20% of diamond particles.

4. The apparatus of claim 3 wherein said PDC layer comprises used cutters from PDC drill bits.

5. The apparatus of claim 3 wherein said tooth has a face portion extending forwardly of the tooth in the rotating wheel's direction of rotation so that the PDC layer supported thereby defines a cutting angle with respect to the PDC layer contacting the stump.

6. The apparatus of claim 1 wherein said elongate root is formed of steel and incorporates a conforming shape to enable said elongate root to be anchored to the rotating wheel.

7. The apparatus of claim 1 wherein said root supports said extending face portion for cutting the stump when rotated thereagainst and said face supports said PDC material formed as a planar member attached thereto by a braze layer having about six percent or more cobalt, and said PDC disc is comprised of a cobalt alloy bonding matrix of carbide particles with diamond particles, wherein said cobalt alloy matrix forms a unitary structure by bonding to said cobalt and diamond particles.

8. The apparatus of claim 7 wherein said PDC layer comprises about 67% or more of WC particles.

9. The apparatus of claim 7 wherein said PDC layer comprises a cobalt based alloy comprising about 4% to about 10% of said layer.

10. The apparatus of claim 7 wherein said PDC layer comprises diamond particles commingled with tungsten carbide particles and bonded into a unitary layer by said cobalt alloy matrix.

11. The apparatus of claim 1 wherein said PDC layer is a planar disc having top and bottom faces defining a thickness of up to about 120 mils, and having a diameter sufficient to cover the extending face portion mounted at an angle with respect to said root.

12. The apparatus of claim 1 wherein said elongate root is essentially in a single plane.

13. The apparatus of claim 1 wherein said elongate root is formed in a single plane and supports an extending face portion in a plane at an angle to said root.

14. A stump cutting tooth for use in a rotating wheel for cutting a stump to below ground level wherein the rotating wheel has a rotating periphery with pockets there in to receive removable teeth therein and the teeth comprise:

(a) an elongate root having a sufficient length to extend into a tooth pocket to enable the tooth to be clamped and held by the rotating wheel;

(b) an extending face portion mounted on said elongate root wherein said face portion and said root define an inscribed angle therebetween when viewed in the rotating wheel's direction of cutting so that, during rotation, said extending face portion is to the side of said elongate root during rotation and so that said rotating wheel is enabled to cut using multiple stump cutting teeth in a kerf of specified width; and (c) a PDC layer attached to the face portion so that the PDC layer contacts the stump with a cutting motion.

15. The apparatus of claim 14 wherein said PDC layer is formed of diamond particles in an alloy binding the diamond particles to form a unitary body.

16. The apparatus of claim 15 wherein said PDC layer forms a unitary body having a thickness of between about 10 and about 120 mils and said PDC layer comprises at least about 20% of diamond particles.

17. The apparatus of claim 16 wherein said PDC layer comprises used cutters from PDC drill bits.

18. The apparatus of claim 16 wherein said tooth has a face portion extending forwardly of the tooth in the direction of rotation so that the PDC layer supported thereby defines a cutting angle with respect to the PDC layer contacting the stump.

19. The apparatus of claim 14 wherein said elongate root is formed of steel and incorporates a conforming shape to enable said elongate root to be anchored to the rotating wheel.

20. The apparatus of claim 14 wherein said root supports said extending face portion for cutting the stump when rotated thereagainst and said face supports said PDC material formed as a planar member attached thereto by a braze layer having about six percent or more cobalt, and said PDC disc is comprised of a cobalt alloy bonding matrix of carbide particles with diamond particles, wherein said cobalt alloy matrix forms a unitary structure by bonding to said cobalt and diamond particles.

* * * * *